United States Patent
Thomazeau

(10) Patent No.: US 6,932,332 B2
(45) Date of Patent: Aug. 23, 2005

(54) HYDRAULIC ANTIVIBRATION SUPPORT

(75) Inventor: Mikaël Thomazeau, Chateaudun (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 10/761,000

(22) Filed: Jan. 20, 2004

(65) Prior Publication Data

US 2004/0212133 A1 Oct. 28, 2004

(30) Foreign Application Priority Data

Feb. 13, 2003 (FR) .............................................. 03 01732

(51) Int. Cl.$^7$ ................................................ F16F 5/00
(52) U.S. Cl. ..................................... 267/140.13; 267/35
(58) Field of Search ....................... 267/140.13, 140.14, 267/35, 219, 220

(56) References Cited

U.S. PATENT DOCUMENTS

| 4,700,931 A | * | 10/1987 | Eberhard et al. | .............. | 267/35 |
| 4,721,292 A | * | 1/1988 | Saito | ..................... | 267/140.13 |
| 4,773,634 A | * | 9/1988 | Hamaekers | ................. | 267/219 |
| 5,833,219 A | * | 11/1998 | Mellon | .................. | 267/140.13 |
| 6,637,734 B2 | | 10/2003 | Thomazeau et al. | | |

FOREIGN PATENT DOCUMENTS

| DE | 4435431 | 4/1995 |
| FR | 2 674 590 | 10/1992 |
| FR | 2828540 | 2/2003 |
| GB | 2282430 | 4/1995 |

OTHER PUBLICATIONS

Patent abstracts of Japan, vol. 1005, No. 02, Mar. 31, 1995 & JP 06 307491 (Tokai Rubber Ind Ltd.).
Patent abstracts of Japan, vol. 009, No. 139 (M–387), Jun. 14, 1985 & JP 60 018632 (Bridgestone KK).
Patent abstracts of Japan, vol. 017, No. 282 (M–1420), May 31, 1993 & JP 05 010375 (Tokai Rubber Ind Ltd).
Preliminary Search Report of French Patent Application FR 0301732 filed Feb. 13, 2003.

* cited by examiner

*Primary Examiner*—Matthew C. Graham
(74) *Attorney, Agent, or Firm*—McCracken & Frank LLP

(57) ABSTRACT

A hydraulic antivibration support comprises two rigid strength members interconnected by an elastomer body which defines a working hydraulic chamber communicating with a compensation chamber via a constricted passage. The two hydraulic chambers are separated by a rigid partition formed by two grids disposed side by side, and a decoupling valve member is clamped between the grids. The decoupling valve member comprises a deformable membrane that, in the rest position, is closer to the second grid than to the first grid.

6 Claims, 3 Drawing Sheets

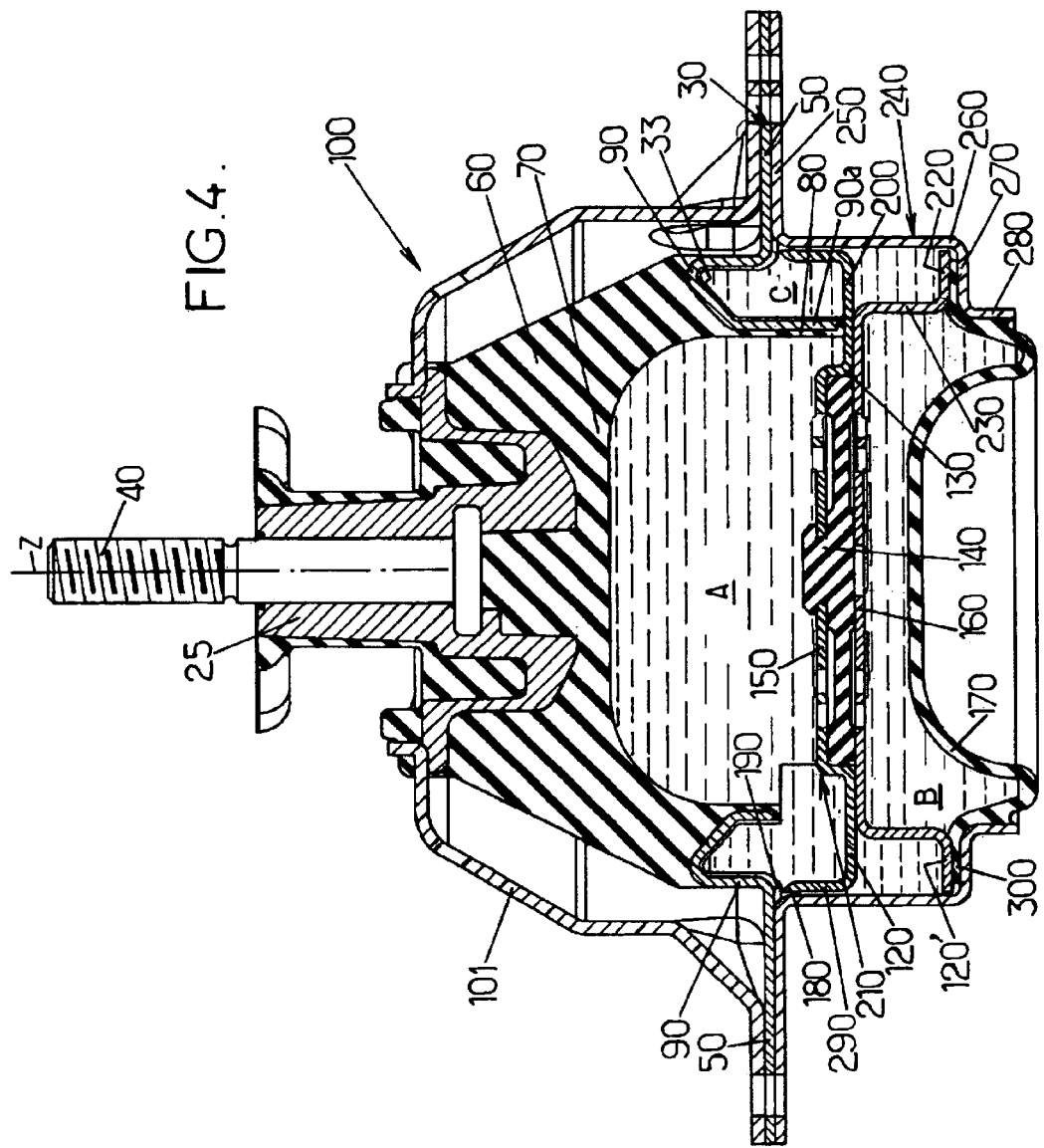

HYDRAULIC ANTIVIBRATION SUPPORT

FIELD OF THE INVENTION

The present invention relates to hydraulic antivibration supports, e.g. for use in mounting motor vehicle engines on the bodywork of such vehicles.

More particularly, the present invention relates to a hydraulic antivibration support for interconnecting first and second rigid elements in order to damp and filter vibration between said elements at least along a main vibration axis, the support comprising:
- first and second rigid strength members for fastening respectively to the first and second rigid elements that are to be united;
- an elastomer body interconnecting the first and second strength members and adapted to accommodate a permanent load along the main vibration axis;
- a liquid-filled working chamber defined at least in part by the elastomer body;
- a flexible wall made of elastomer and secured to the second strength member;
- a liquid-filled compensation chamber defined in part by the flexible wall made of elastomer;
- a liquid-filled constricted passage putting the working chamber into communication with the compensation chamber; and
- a decoupling device comprising a decoupling valve member made of elastomer interposed between a first grid which communicates with the working chamber and a second grid which communicates with the compensation chamber, the decoupling valve member comprising at least one deformable membrane which is held in a rest position in the absence of vibration and which is adapted to move elastically between the first and second grids in the presence of vibration.

BACKGROUND OF THE INVENTION

Document FR-01/10 545 describes an example of such an antivibration support which gives complete satisfaction in terms of operation, in particular for avoiding or limiting phenomena associated with the valve member banging against the grids, which can generate vibration and/or noises that are disagreeable for the users of the vehicle.

The present invention seeks to propose another antivibration support of the same type.

To this end, according to the invention, in a hydraulic support of the kind in question, the deformable membrane, when in its rest position, is closer to the second grid than to the first grid.

By means of these dispositions, the hydraulic antivibration support of the invention enables the noise of the membrane banging against the grids of the decoupling device to be reduced considerably. The inventors of the present invention have observed that the above disposition makes it possible to attenuate strongly the banging noise that is observed while the vehicle is running, particularly when the working chamber tends to become compressed suddenly because of the vehicle passing over a large irregularity in the road.

In preferred embodiments of the hydraulic antivibration support of the invention, recourse may optionally be had to one or more of the following dispositions:
- the decoupling valve member, excepting the membrane, is clamped between the grids;
- the decoupling valve member presents a periphery clamped between the grids;
- the decoupling valve member presents a central zone clamped between the grids;
- the decoupling valve member presents a plurality of distinct deformable membranes;
- in the rest position, the deformable membrane is separated from the first and second grids by respective first and second distances, with the first distance lying in the range 1.5 times to 2.5 times the second distance; and
- the membrane(s) occupy(ies) 40% to 60% of the total area of the decoupling valve member.

BRIEF DESCRIPTION OF THE DRAWINGS

Other features and advantages of the present invention appear from the following description of non-limiting embodiments, given with reference to the accompanying drawings, in which:

FIG. 4 is a vertical section view of a hydraulic antivibration support constituting a second embodiment of the invention.

MORE DETAILED DESCRIPTION

In the various figures, the same references are used to designate elements that are identical or similar.

Figure 1:
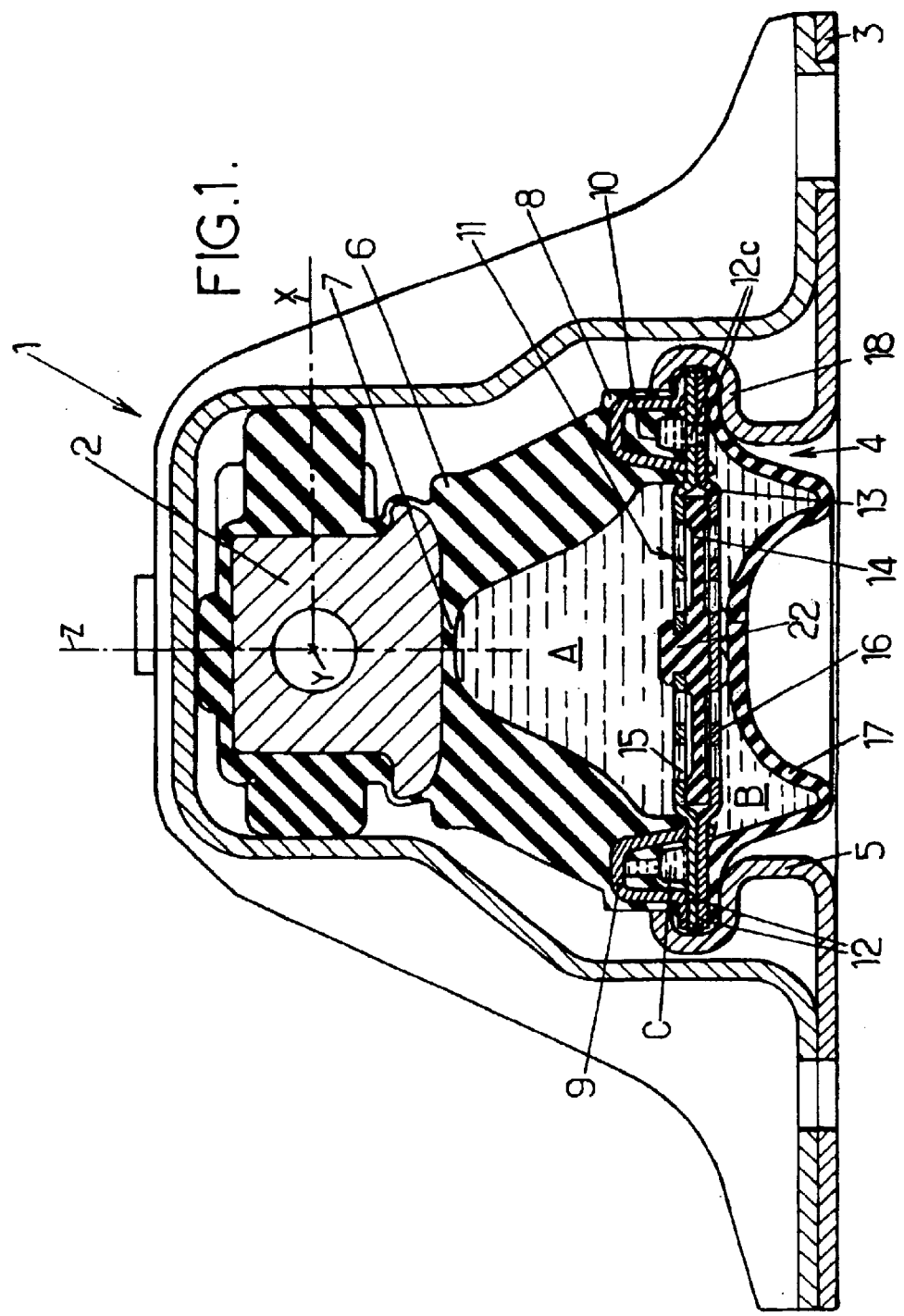
FIG. 1 is a vertical section view of a hydraulic antivibration support constituting an embodiment of the invention.

FIG. 1 shows an antivibration support 1 comprising:
- a first rigid metal strength member 2 which, in the example shown, may extend longitudinally along a horizontal axis Y and which is for fastening to the power unit of a vehicle, for example;
- a second rigid metal strength member 3 for fastening to the bodywork of the vehicle, for example, this second strength member 3 in the example described being in the form of a horizontal piece of sheet metal having a central opening 4 presenting an upwardly-directed raised annular rim 5; and
- an elastomer body 6 in the form of a bell extending along a main vibration axis Z that is vertical between firstly a top 7 that is overmolded on and bonded to the first strength member 2, and secondly an annular base 8 secured to the second strength member 3, the elastomer body 6 being strong enough to accommodate the compression forces due to the weight of the power unit.

Advantageously, the annular base 8 of the elastomer body is reinforced by a sheet-metal ring 9 which is embedded in said base and which preferably presents a channel section open parallel to the vertical axis Z and facing towards the second strength member 3, i.e. downwards. The ring 9 thus defines an internal volume which is partially filled with a mass of elastomer defining a circularly arcuate groove 10 that is open parallel to the axis Z facing towards the second strength member 3.

The antivibration support 1 also has a rigid partition 11 which extends perpendicularly to the axis Z and which is pressed in leaktight manner against the annular base 8 of the elastomer body, co-operating therewith to define a liquid-filled working chamber A.

The partition 11 is made up of two pieces of sheet metal 12 that have been cut and stamped, the pieces being placed side by side to define between them a valve-member housing 13 in which there is received a decoupling valve member 14 made of elastomer. Each of the two sheet-metal pieces 12 includes a grid 15, 16. The top grid 15 and the bottom grid 16 enable the valve-member housing 13 to communicate via liquid-passing holes respectively with the working chamber A and with a compensation chamber B that is also filled with liquid.

The compensation chamber B is separated from the working chamber A by the partition 11, and between said partition 11 and a flexible elastomer wall 17 said compensation chamber B forms a bellows, for example.

The annular base 8 of the elastomer body, the partition 11, and the peripheral edge of the flexible wall 17 may be assembled together by being crimped onto the second strength member 3.

Thus, said ring 9 and the base 8 of the elastomer body are pressed strongly against the periphery of the top sheet-metal piece 12, which is itself pressed against the periphery of the bottom sheet-metal piece 12, which clamps the periphery of the flexible wall 17 against a shoulder 18 of the second strength member 3.

The hydraulic chambers A and B communicate with each other via a constricted passage C filled with liquid that is defined between the above-mentioned groove 10 and the top sheet-metal piece 12.

Figure 3:
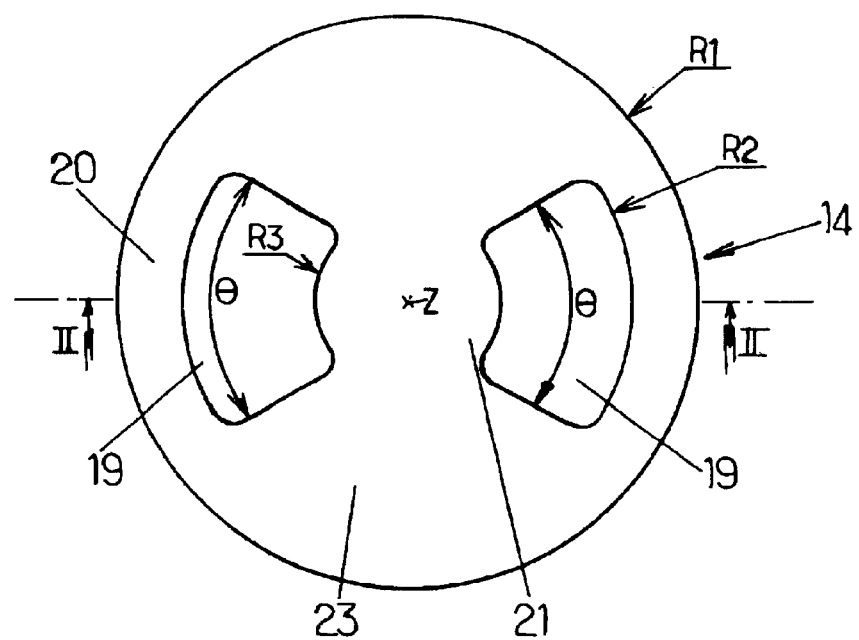
FIG. 3 is a view of the underside of the decoupling valve member of FIG. 1.

As shown in greater detail in FIG. 3, the elastomer decoupling valve member 14 is advantageously in the form of a disk of radius R1 centered on the axis Z.

The decoupling valve member 14 presents at least one deformable membrane 19, and while the valve member is in the rest position, i.e. so long as the vehicle is not running and the engine is stopped, the membrane 19 lies at a distance D1 from the top grid 15 and at a distance D2 from the bottom grid 16, with the distance D1 being greater than the distance D2. Advantageously, the ratio D1/D2 may lie in the range 1.5 to 2.5, for example.

Figure 2:
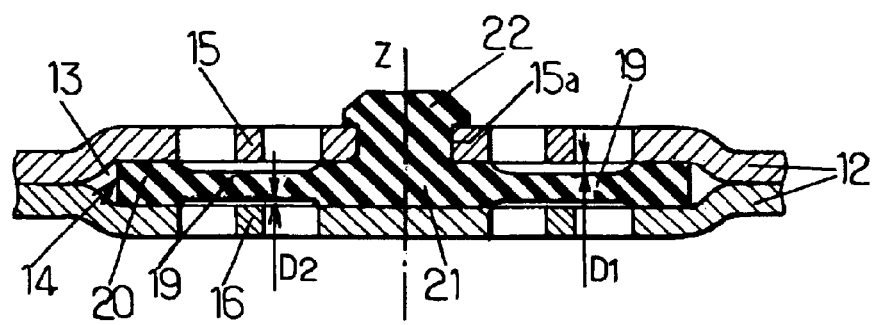
FIG. 2 is a detail view showing the decoupling valve member of the antivibration support of FIG. 1.

In the particular example shown in FIGS. 2 and 3, the decoupling valve member 14 has two membranes 19 each occupying a relatively small fraction of the total area of the decoupling valve member 14, the total fraction lying, for example, in the range 40% to 60% of said total area.

In this example, the fixed portions of the decoupling valve member 14 are molded integrally with the membranes 19, and said thick portions are of thickness that is substantially equal to the spacing between the two grids 15 and 16 so as to be clamped between said two grids, thereby enabling the membranes 19 to be positioned in the desired disposition when at rest.

The thick portions of the decoupling valve member 14 may comprise, for example: a periphery 20, a central portion 21 made, for example, with a stud 22 that is snap-fastened in a central orifice 15a of the grid 15, and two intermediate portions 23 occupying the angles between the two membranes 19 about the axis Z, which membranes 19 are disposed symmetrically relative to the axis Z.

As shown in FIG. 3, each of the membranes 19 may be defined, for example, by a substantially circular outer edge centered on the axis Z, of radius R2 less than R1, and by a substantially circular inner edge centered on the axis Z, of radius R3 less than R2, said membrane being angularly defined by two substantially radial edges forming between them an angle about the axis Z of value θ that lies in the range 45° to 65°, for example.

In the presence of vibration coming from the engine and/or the bodywork of the vehicle, the membranes 19 move elastically between the first and second grids 15 and 16.

When the vibratory movements are of high frequency (e.g. higher than 20 hertz (Hz)) and of small amplitude (e.g. less than 1 millimeter (mm)), these vibratory movements are filtered by the decoupling membranes 19 which oscillate freely between two grids 15 and 16.

When the vibratory movements are of relatively low frequency (e.g. lower than 20 Hz) and of relatively large amplitude (e.g. greater than 1 mm), they lead to liquid being transferred between the chambers A and B via the constricted passage C, which passage damps the vibratory movements of the liquid.

In the specific case of sudden movements of large amplitude between the engine and the vehicle bodywork (due in particular to the vehicle running over a large irregularity in the road), phenomena of the decoupling valve member banging against the grids during the transfer of liquid to the compensation chamber B are considerably reduced because of the dispositions of the present invention, while nevertheless maintaining satisfactory decoupling at high frequency and low amplitude (as guaranteed by the total distance D1+D2 available for movement of the valve member 14).

FIG. 4 is a vertical section view of an antivibration support 100 constituting a second embodiment of the invention.

The hydraulic antivibration support 100 comprises first and second strength members 25 and 30 for fastening respectively to the power unit and to the bodywork of a vehicle, for example.

In the example described, the first strength member 25 is in the form of a metal peg made of light alloy, for example, centered on a vertical axis Z and secured to a threaded pin 40, e.g. enabling the peg to be fastened to the power unit.

The second strength member 30 is formed by a ring of cutout and stamped sheet metal, likewise centered on the axis Z. In the example shown, the second strength member 30 comprises an outer portion 50 which extends in a radial plane relative to the axis Z and which is designed to be fastened to the bodywork of the vehicle, for example, and a hollow inner portion 90 substantially of upside-down channel section forming an annular groove 33 that is axially open facing away from the first strength member 25. The inner portion 90 also forms an axial inner skirt 90a which extends downwards beyond the outer portion 50.

The two strength members 25 and 30 are interconnected by a relatively thick elastomer body 60 which presents sufficient compression strength to accommodate the static forces due to the weight of the power units. This elastomer block 60 presents a bell-shaped side wall which extends between a top 70 overmolded on the first strength member 25 and an annular base 80 which is overmolded on the inner portion 90 of the second strength member.

The second strength member 30 is also secured to a rigid cap 101 made of sheet metal, that is annular in shape and that overlies the elastomer body 60 with clearance, allowing the pin 40 to pass through. The cap 101 thus limits relative displacement between the first and second strength members 25 and 30.

The second strength member 30 is also secured to a rigid partition 110 which co-operates with the elastomer body 60 to define a liquid-filled first chamber A referred to as a "working" chamber.

In the example described, the rigid partition 110 is made up of first and second stamped and superposed sheet-metal pieces 120 and 120' that are in the form of cups, having respective central portions forming a flat bottom grid 160 and a flat top grid 150 extending perpendicularly to the central axis Z and defining between them a valve-member housing 130 in which there is received a decoupling valve member 140 made of elastomer. The top grid 150 and the bottom grid 160 put the valve-member housing 130 into communication respectively with the working chamber A, and with a compensation chamber B that is also filled with liquid, via holes for passing liquid.

By way of example, the first sheet-metal piece 120 comprises:

- an annular rim 290 which extends parallel to the axis Z, the annular rim presenting a free top annular ridge 180 bearing in leaktight manner against a layer of elastomer 190, which layer 190 forms part of the elastomer body 60 and is overmolded under the outer portion 50 of the second strength member;
- an annular portion 200 which extends radially inwards from the bottom edge of the rim 170, the inner skirt 90a of the second strength member bearing in leaktight manner against said annular portion 200;
- a step 210 extending towards the working chamber A from the radially inner edge of the annular portion 120; and
- said top grid 150 which extends the step 210 radially inwards.

In addition, the second sheet-metal piece 120' in the example described comprises:

- an annular outer bearing edge 220 that extends radially relative to the central axis Z;
- an annular step 230 that extends axially parallel to the axis Z towards the first sheet-metal piece 120; and
- said bottom grid 160 that presents an outer periphery bearing under the annular portion 200 of the first sheet-metal piece 120.

The antivibration support 100 further comprises a base 240 made of cut and stamped sheet metal and comprising:

- an annular bearing edge 250 that is secured to the outer portion 50 of the second strength member, e.g. by crimping, and that bears in leaktight manner against said elastomer layer 190 under the outer portion 50 of the second strength member;
- an axially-extending annular side wall 260 that extends from the inner periphery of the bearing edge 250 parallel to the axis Z and away from the second strength member 30;
- a bottom bearing edge 270 that extends the bottom end of the side wall 260 radially inwards; and
- an axial rib 280 that extends axially away from the elastomer body 60 from the radially inner portion of the bearing edge 270.

The bearing edge 270 and the rib 280 of the base 240 have a flexible bellows 170 of elastomer overmolded thereon, which elastomer also forms a layer 300 covering the bearing edge 270 of the base and against which the bearing edge 220 of the second sheet-metal part 120' bears in leaktight manner.

The bellows 170 thus co-operates with the partition 110 to define the second chamber B.

This compensation chamber B communicates with the working chamber A via an annular constricted passage C.

The decoupling valve member 140 presents the same characteristics, in particular relative to the respective grids 150 and 160, as are presented by the valve member 14 shown in FIGS. 1 and 2 and described above, with respect to the respective grids 15 and 16.

Like the antivibration support of FIGS. 1 to 3, the antivibration support 100 shown in FIG. 4 enables the phenomena of the decoupling valve member banging against the grids to be reduced considerably by means of the dispositions of the present invention, particularly in the event of sudden movements between the power unit and the bodywork of the vehicle.

What is claimed is:

1. A hydraulic antivibration support for interconnecting first and second rigid elements in order to damp and filter vibration between said elements at least along a main vibration axis, the support comprising:

first and second rigid strength members for fastening respectively to the first and second rigid elements that are to be united;

an elastomer body interconnecting the first and second strength members and adapted to accommodate a permanent load along the main vibration axis;

a liquid-filled working chamber defined at least in part by the elastomer body;

a flexible wall made of elastomer and secured to the second strength member;

a liquid-filled compensation chamber defined in part by the flexible wall made of elastomer;

a liquid-filled constricted passage putting the working chamber into communication with the compensation chamber; and a decoupling device comprising a decoupling valve member made of elastomer interposed between a first grid which communicates with the working chamber and a second grid which communicates with the compensation chamber, the decoupling valve member comprising at least one deformable membrane portion which is held in a rest position in the absence of vibration and which is adapted to move elastically between the first and second grids in the presence of vibration;

wherein the deformable membrane portion, when in its rest position, is closer to the second grid than to the first grid;

and wherein the decoupling valve member, excepting the membrane portion, is clamped between the grids.

2. An antivibration support according to claim 1, in which the membrane(s) occupy(ies) 40% to 60% of the total area of the decoupling valve member.

3. An antivibration support according to claim 1, in which the decoupling valve member presents a periphery clamped between the grids.

4. An antivibration support according to claim 1, in which the decoupling valve member presents a central zone clamped between the grids.

5. An antivibration support according to claim 1, in which the decoupling valve member presents a plurality of distinct deformable membranes.

6. An antivibration support according to claim 1, in which, in the rest position, the deformable membrane is separated from the first and second grids by respective first and second distances, with the first distance lying in the range 1.5 times to 2.5 times the second distance.

* * * * *